United States Patent

[11] 3,580,081

[72] Inventors  Sol Greenberg
  Roslyn;
  Heinz Rosen, Hicksville; Richard
  Weinberger, Oceanside; Guy Mongodin,
  Huntington, N.Y.
[21] Appl. No. 856,686
[22] Filed Sept. 10, 1969
[45] Patented May 25, 1971
[73] Assignee Veeco Instruments, Incorporated
  Plainview, N.Y.

[54] VACUUM GAUGE
  18 Claims, 5 Drawing Figs.
[52] U.S. Cl............................................................ 73/399
[51] Int. Cl........................................................ G01l 21/12
[50] Field of Search................................................ 73/399

[56] References Cited
  UNITED STATES PATENTS
2,938,387  5/1960  Hamilton........................ 73/399
3,066,537  12/1962  Rivera........................... 73/399

Primary Examiner—Donald O. Woodiel
Attorney—Morgan, Finnegan, Durham & Pine

ABSTRACT: Disclosed herein is a Pirani-type pressure gauge having a sensor head incorporating a pressure-responsive filament, a calibrated pressure indicator, and related circuitry for converting the voltage drop across the filament into a meaningful pressure indication. The net current supplied to the filament includes both an energizing component and an indicator drive component. This net current is maintained constant by a constant current source so that, excluding ambient temperature affects, the voltage across the filament is indicative of filament resistance and consequently ambient pressure, notwithstanding the effect of the indicator. Temperature effects are minimized by a simple compensating impedance in the filament-indicator circuit which also includes scale-calibration controls and means for shaping filament response. The calibration, compensation, and shaping components are located in the filament sensor head in such a manner as to obviate the usual field adjustments required to match the sensor head and indicator.

PATENTED MAY 25 1971

INVENTORS
SOL GREENBERG
HEINZ ROSEN
RICHARD WEINBERGER
GUY MONGODIN

BY Morgan, Finnegan, Durham & Pine
ATTORNEYS

VACUUM GAUGE

BACKGROUND AND SUMMARY OF THE INVENTION

The present invention relates to pressure-measuring instruments and, more particularly, to Pirani-type pressure gauges which measure pressure by utilizing a heated filament exposed to ambient conditions. Filaments for this purpose have a resistance which is a function of filament temperature. Within the pressure region in which the gauge will function, heat transfer from the filament is related to the molecular conduction of the environment surrounding the filament which, in turn, defines the pressure of such an environment. Thus, temperature and therefore resistance of the filament becomes indicative of ambient pressure. Accordingly, by measuring a parameter, e.g. filament current or filament voltage, which responds to filament resistance, a measure of ambient pressure may be obtained.

To provide an accurate, wide-range instrument of this type, without prohibitive complexity and cost, means must be provided for: (1) tailoring the filament characteristics which vary from filament to filament, to the indicator circuitry; (2) compensating for ambient temperature; (3) shaping the filament response to expand a portion of the indicator scale so as to monitor particular environmental conditions; (4) compensating for the effects of the indicator circuit on the filament; and (5) optimizing the relationship between range of operation and sensitivity while avoiding problems associated with outgassing, filament life, and the like.

It is accordingly an object of the invention to provide a Pirani-type pressure gauge meeting the foregoing requirements in a simple and efficacious manner.

A still further object of the invention is to eliminate the need for recalibration in the field of the pressure gauge each time a sensor head requires replacement.

Another object of the invention is to provide (1) a Pirani pressure gauge which employs a simple measuring circuit while, at the same time, compensating for the effects of the indicator on the filament; (2) a sensor head for a Pirani gauge having means for simplifying the physical steps required to replace filaments; (3) a Pirani gauge having a simple arrangement for compensating for ambient temperature, for shaping the filament response so that specific environmental conditions can be monitored, and for optimizing range and sensitivity; and (4) a Pirani gauge having a simplified regulated power supply.

These and other objects and advantages of the invention will be set forth in part hereinafter or will be obvious from the description which follows or from practicing the invention.

Serving to illustrate an exemplary embodiment of the invention are the drawings of which:

DETAILED DESCRIPTION OF THE INVENTION

Figure 1:
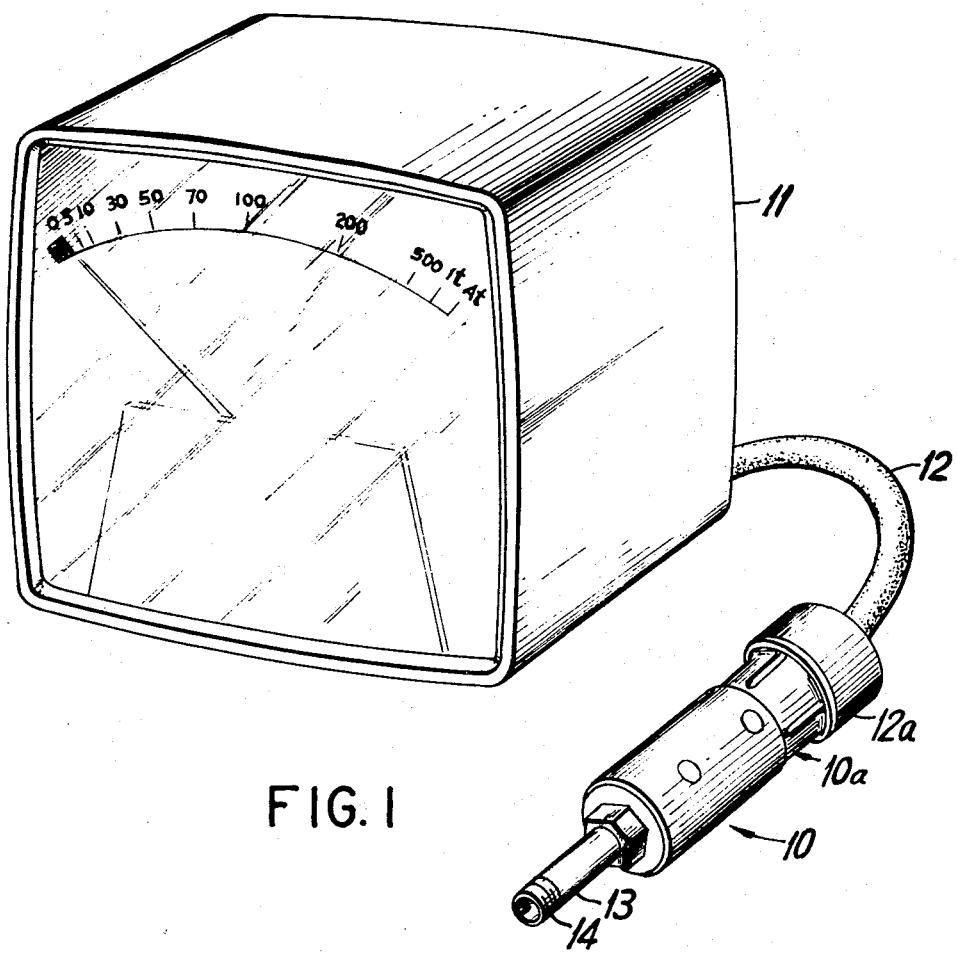
FIG. 1 is a perspective view of the pressure gauge of the instant invention depicting the meter indicator, the sensor head and the electrical coupling between the two.
Figure 2:
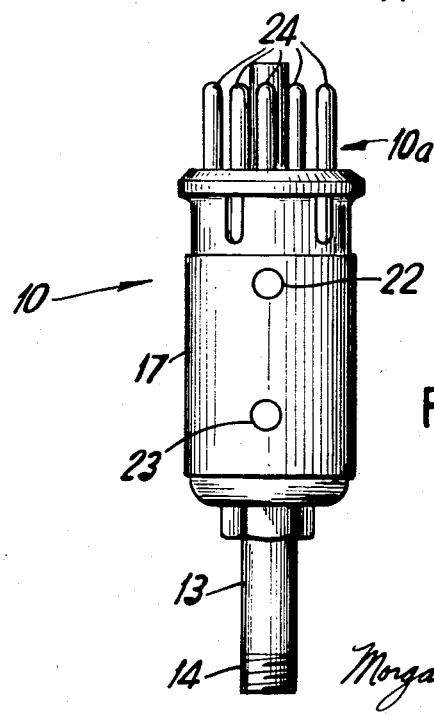
FIG. 2 is a front elevational view of the sensor head uncoupled from the remainder of the gauge.
Figure 3:
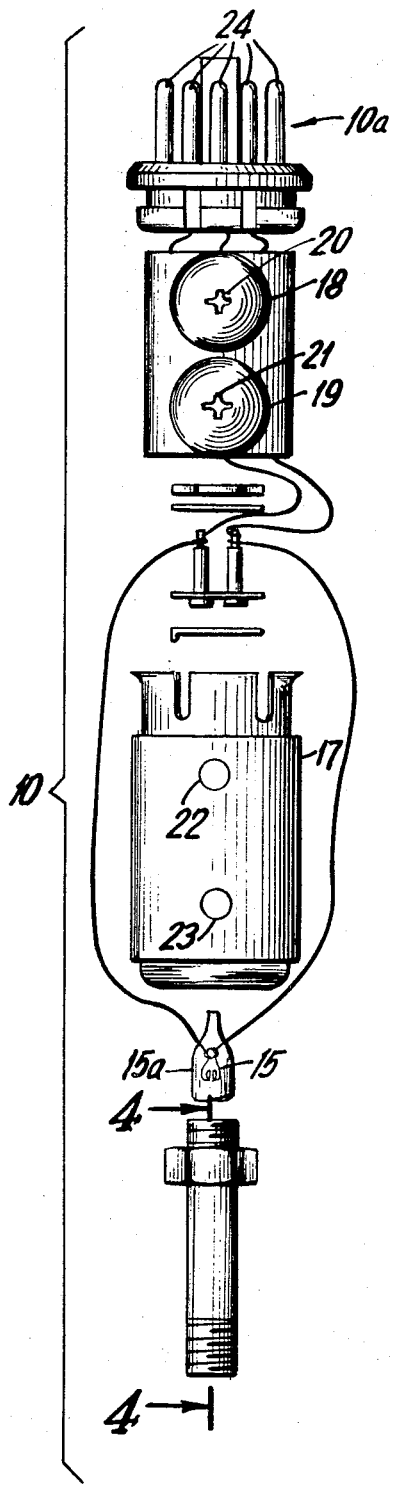
FIG. 3 is an exploded front elevational view of the sensor head of FIG. 2.
Figure 4:
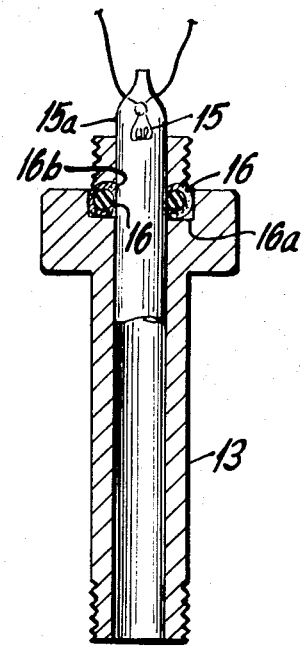
FIG. 4 is a partial vertical sectional view of the sensor head depicting the seating of the filament within the sensor head taken along line 4—4 of FIG. 3.

The physical characteristics of the exemplary embodiment of the invention are illustrated in FIGS. 1 to 4. As shown therein, the instrument comprises a sensor head 10 and a remote pressure indicator unit 11, these two being interconnected by a cable 12 having a socket 12a which mates with a plug 10a on the head 10, thus electrically coupling the sensor and indicator.

The sensor head includes a tube 13, the threaded end 14 of which is utilized for coupling the sensor head to the environment, the pressure of which is to be measured. The proximal end of the tube houses pressure-sensitive filament or hot wire 15 with its associated envelope 15a. This filament assembly extends partially into tube 13, being resiliently gripped by an O-ring 16 seated in a recess 16a in the periphery of the tube. Vacuum grease 16b is applied to the junction of the O-ring and casing 15a to seal the environment under test. As a result of this arrangement the filament assembly is readily installed in a sealing relationship in head 10 with a minimum of effort. Although an O-ring seal is utilized within the above embodiment, it should be pointed out that any other sealant means can be utilized to vacuum seal the filament assembly within the sensor head.

An exemplary filament has a resistance in the range of about 100—300 ohms and a relatively large surface area/mass ratio to provide short response times.

The proximal end of tube 13 housing the filament assembly is threaded in a housing 17 which contains circuit components associated with the filament. These include potentiometers 18 and 19. Respective apertures 22 and 23 in the housing 17 provide access to the wipers 20 and 21 of the potentiometers to facilitate their adjustment without the need to disassemble the head.

Potentiometers 18 and 19 and other sensor components described hereinafter are connected to pins 24 of plug 10a. The latter mate in turn with corresponding contacts of the connector 12a on cable 12. Leads in cable 12 interconnect the contacts of 12a to circuit points in the indicator assembly 11 as shown in the schematic wiring diagram of FIG. 5.

Figure 5:
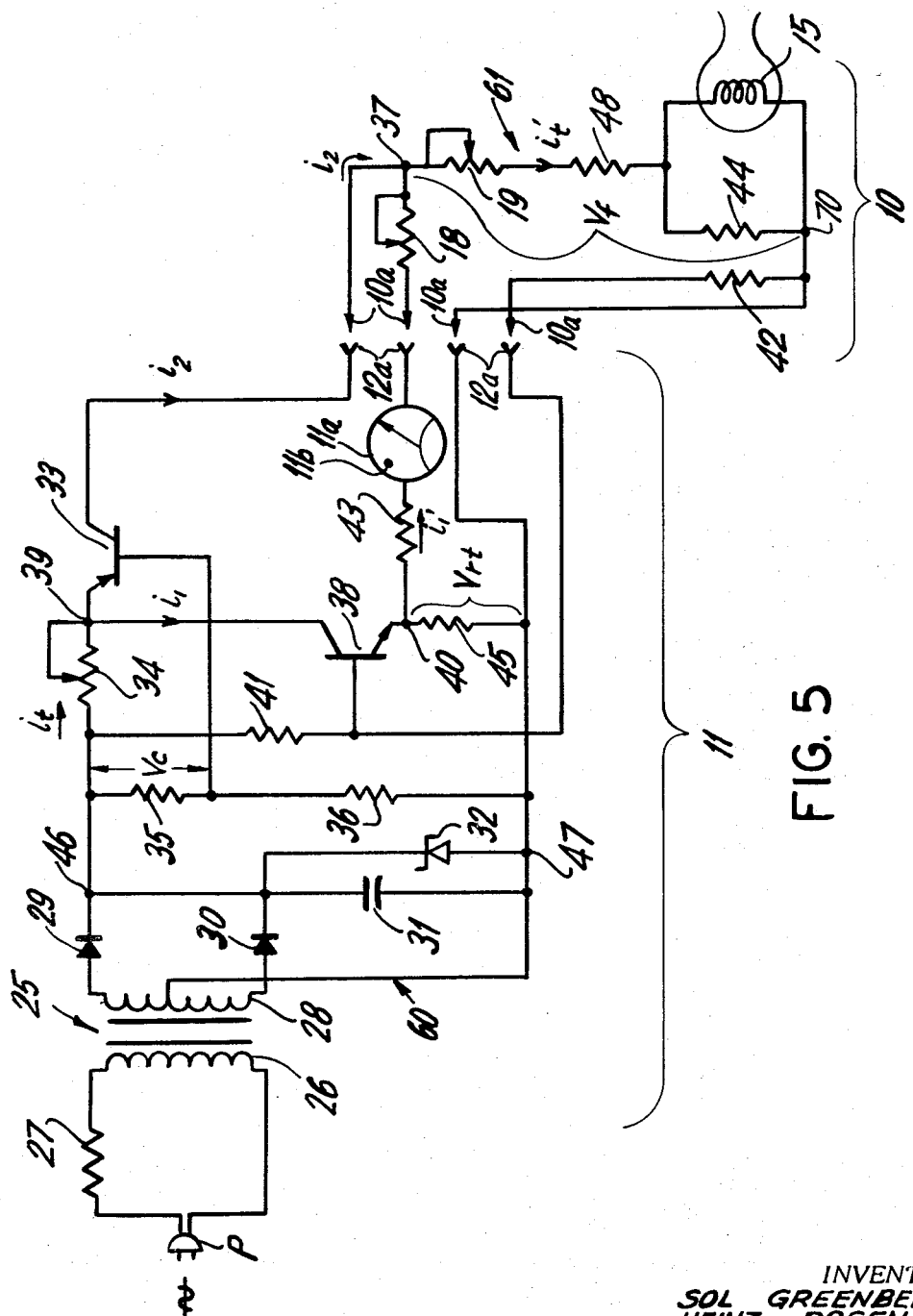
FIG. 5 is an electrical schematic of the circuitry of the pressure gauge.

In FIG. 5, the indicator assembly 11 is shown at the left, the sensor head 10 at the right, and the cable 12 and connectors 12a and 10a between the two.

The indicator 11 includes a DC potential source generally indicated at 60, a constant current regulator utilizing transistor stage 33, and a measuring circuit embodying transistor stage 38 and meter 11a for measuring the response of filament 15 in head 10 to ambient pressure.

The filament circuit in sensor 10 includes a filament branch 61 containing filament 15 and various resistances explained hereinafter including the previously mentioned potentiometers 18, 19.

The source of potential 60 of indicator 11 includes a full-wave rectifier comprising diodes 29 and 30 and filter capacitance 31 connected in full-wave configuration across the secondary 28 of a power transformer 25. The primary 26 of the latter is adapted for connection to an AC source via a plug P and series resistor 27.

VOLTAGE REGULATOR

Means are provided for regulating the DC potential appearing across filter 31. As embodied these means take the form of a Zener diode 32 which, unlike conventional arrangements, is connected directly across the DC output terminals of the rectifier, i.e. directly across filter 31. The resistance usually placed in series with the Zener diode, is connected as resistor 27 in the primary circuit of transformer 25 thereby permitting a less expensive transformer and reducing the effects of line frequency changes. This arrangement is possible because of the relatively low loading effect provided by the overall instrument circuit (e.g. 10—20 ma).

CONSTANT CURRENT SOURCE

The exemplary constant current source, which includes PNP transistor 33, obtains a reference voltage, $V_c$, by way of a divider comprising the series combination of resistors 35 and 36 connected across the regulated voltage source. The base of transistor 33 is connected to the junction of these resistors while its emitter is connected to the regulated DC source via an adjustable resistor 34 which functions to sense the current $i_t$ flowing out of the regulated rectifier. The regulating action of stage 33 thereby tends to maintain the current $i_t$ flowing through resistor 34 at a substantially constant value. Adjustment of resistance 34 sets the value of $i_t$.

The regulated current $i_t$ divides at junction point 39 into two branch currents, $i_1$ and $i_2$. The current $i_2$ supplies the filament circuit while the current $i_1$ flows to the meter circuit via NPN stage 38. The temperature effects in the base-emitter circuit of 38 are compensated for by having the resistance of resistor 42 equal the resistance of resistor 35 and additionally by having the resistance of resistor 34 equal the resistance of the parallel combination of resistor 45 and the lumped resistance across terminal 37 and node 70.

METER CIRCUIT

The latter stage, comprising an emitter-follower, includes a reference voltage in its base-emitter circuit obtained by the connection of its base to the resistance divider formed by resistances 41 and 42 connected across the regulated DC supply.

The voltage across resistance 42, being coupled to the base of the emitter-follower 38, causes a voltage $V_{rt}$ to appear across resistance 45 in the emitter circuit. Voltage $V_{rt}$ serves as a comparison voltage. Meter 11a in effect compares this voltage with the voltage $V_f$ controlled by the pressure-sensitive filament 15. To this end the meter circuit includes the meter proper 11a in series with resistance 43 and potentiometer 18, the combination being connected between the terminal 37 of branch 61 where $V_f$ appears and terminal 40 where $V_{rt}$ appears. Note that amplification is not required to drive the meter.

FILAMENT CIRCUIT

The filament 15 in branch 61 is shunted by a response-shaping resistance 44. This combination is connected in series with the series combination of resistance 48 and potentiometer 19. The filament branch 61 thus constituted, is energized by a current $i_{t'}$ which is substantially equal to the current $i_t$ flowing through resistance 34 and maintained constant by the previously described constant current source.

This may be seen by noting that current $i_{t'}$ includes the component $i_2$ flowing in the emitter-collector circuit of stage 33 and a second component $i_{1'}$ which flows from junction 39 through the collector-emitter of stage 38 and thence through resistance 43, meter 11a and potentiometer 18 into filament branch 61.

By choice of circuit parameters, including a value for resistance 45 which is relatively large, the current $i_{1'}$ flowing into filament branch 61 via meter 11a is substantially equal to current $i_1$ flowing from the constant current source. Accordingly, the filament-energizing current $i_{t'}$ is substantially equal to $i_t$ and is maintained constant. (The filament may be regarded as including its response-shaping resistance 44). The filament circuit accordingly "sees" a very high impedance and those loading precautions involving nulling techniques, isolation amplifiers and the like need not be observed.

The shaping provided by resistance 42 is such as to accentuate the change in resistance at the low-pressure end of the operating range for a given change in pressure. This permits an extended range while at the same time enabling the use of an easily read scale on meter 11a.

Since filament 15 is energized by a constant current, the resultant voltage is solely related to filament resistance. Since voltage $V_{rt}$ compensates for the effect of ambient temperature on filament resistance, the filament voltage will supply an indication of ambient pressure. In the illustrative embodiment the filament branch current $i_{t'}$ is in the order of 10 ma±1 percent. This area of operation balances the problems of filament durability, degassing and oxidation, reproducibility and meter sensitivity.

CALIBRATION

Potentiometer 19 in the filament branch 61 is factory adjusted to establish the low pressure or zero point of meter 11a while potentiometer 18 is adjusted to make the full scale reading of the meter correspond to the maximum (1 atmosphere) pressure condition.

In the illustrative embodiment, the meter operates over the range 1 micron to atmosphere; however, the effective calibration is from 1 micron to 1 torr. At 1 micron the filament resistance is maximum, and the voltage $V_f$ is maximum and approaches the value of $V_{rt}$ when potentiometer 19 is properly adjusted. At the maximum pressure condition (e.g. 1 atmosphere) the filament resistance is minimum as is the filament voltage. This voltage is adjusted by potentiometer 18 to provide the required full scale deflection of the meter.

The adjustment of potentiometers 18 and 19 thus serves to set the end points of the operating range and take into effect the tolerances of the filament, the voltage dividers and the Zener regulator. Sensor head 10 can therefore be replaced without necessitating recalibration of the meter.

When the filament 15 finally fails, the meter 11a deflects to the mechanical zero position which is to the left of the electrical zero of the scale. To minimize the possibility that this would be misconstrued as a high vacuum condition, the meter face is provided with a suitable indication 11b to warn the user of the possibility of filament failure.

The illustrated embodiment provides a low-cost instrument for measuring pressure in the range of about 1 micron to 1 torr with reproducible readings within 2 percent, absolute accuracy, based on McLeod calibration of ±25 percent, and relatively rapid response time.

We claim:

1. A Pirani-type gauge having a pressure-sensitive filament, indicator means, and means for supplying said filament with the combination of energizing current and current flowing through said indicator means, said supply means comprising a constant current source for maintaining constant said combined currents flowing through said filament.

2. Apparatus as defined in claim 1 in which said pressure-sensitive filament is located in a sensing head remote from said indicator means and including means in said head for matching said filament to said indicator means whereby a new head and filament may be substituted without the need for new calibration.

3. Apparatus as defined in claim 1 in which said indicator means comprises a meter operable in response to said current flowing therethrough without the need for amplification.

4. Apparatus as defined in claim 1 including a filament circuit containing said filament and response-shaping means for midi modifying the response of said filament.

5. A Pirani-type pressure gauge comprising:
   1. pressure-responsive filament means,
   2. means for supplying energizing current to said filament means,
   3. measuring means connected to said filament means for indicating data related to said pressure,
   4. said measuring means being interconnected with said filament means whereby the net current through said filament means includes the effect of said measuring means, and
   5. regulator means responsive to said net current for maintaining same substantially constant.

6. Apparatus as defined in claim 5 including a sensing unit containing said filament means and remote from said supply means and measuring means, said sensing unit including calibration means in circuit with said filament means for matching said filament means to said measuring means.

7. Apparatus as defined in claim 5 in which said filament means includes pressure-sensitive filament and means for modifying the response of said filament.

8. Apparatus as defined in claim 5 in which said measuring means includes a reference potential for comparison with a signal responsive to the condition of said filament means.

9. In a Pirani-type pressure-measuring instrument having a sensing head containing a filament for developing a signal indicative of ambient pressure, and a remote measuring circuit for measuring said signal, the improvement comprising means in said sensing head for matching said filament to said measuring circuit thereby facilitating replacement of said head and filament without further matching adjustments.

10. Apparatus as defined in claim 9 in which said matching means comprises variable resistance means.

11. Apparatus as defined in claim 9 in which said matching means comprises means for adjusting said signal under minimum and maximum pressure conditions.

12. In a Pirani-type pressure-measuring instrument having a sensing head containing a filament for developing a signal indicative of ambient pressure, and a remote measuring circuit for measuring said signal and wherein said filament communicates with the pressure to be sensed, the improvement comprising means resiliently gripping said filament in sealing relationship whereby the replacement of said filament is simplified.

13. A pressure gauge comprising:
  a. a source of potential;
  b. means for converting said source of potential into a direct current source of constant magnitude;
  c. a sensing filament whose resistance varies in a direct relationship to the pressure of an environment into which said sensing filament has been placed wherein said sensing filament is electrically coupled to said current of constant magnitude;
  d. circuitry between said means for converting said source of potential into a direct current source of constant magnitude and said sensing filament wherein the input and output magnitudes of the current supplied to and flowing from said circuitry does not vary and wherein the value of said filament resistance affects the flow of current within said circuitry so as to provide for a meaningful measurement of the pressure of the environment surrounding said filament, said circuitry comprising:
    1. a first terminal point electrically coupled in series with said means for converting said source of potential into a direct current source of constant magnitude;
    2. a second terminal point electrically coupled in series with said filament;
    3. a first and a second voltage divider network coupled across said converting means;
    4. a first electrical path coupling said first terminal point to said second terminal point for the carrying of a portion of said current of constant magnitude, the magnitude of said portion of current varying in a direct relationship to the resistance of said filament wherein said first electrical path comprises:
      i. a first transistor having an emitter, a collector and a base, said collector being coupled to said first terminal point, said emitter being coupled to a third terminal point having a constant magnitude of voltage impressed upon it and said base being coupled to said first voltage divider network, wherein the magnitude of current flowing into the collector of said first transistor effectively flows to said third terminal point;
      ii. an indicator having one of its two terminals coupled in series with said third terminal point;
      iii. a first potentiometer having one of its two terminals coupled in series with the free terminal of said indicator and the other terminal of said first potentiometer coupled in series to said second terminal point;
    5. a second electrical path additionally coupling said first terminal point to said second terminal point for the carrying of said current of constant magnitude not flowing through said first electrical path wherein a second transistor having an emitter, a collector and a base is coupled within said second path having said emitter coupled to said first terminal point, said collector coupled to said second terminal point and said base coupled to said second voltage divider network the magnitude of current appearing at said emitter being effectively applied to said second terminal points; and
  e. a second potentiometer coupled between said sensing filament and said second terminal point.

14. A pressure gauge as described in claim 13 wherein said filament is contained within a sensor head electrically detachably coupled to said indicator wherein said sensor head comprises:
  a. a housing;
  b. a hollow cylindrical member detachably affixed to said housing open on both ends and containing said filament;
  c. means for providing a pressurized coupling between said filament and the interior wall of said hollow cylindrical member;
  d. means for mounting said first and second potentiometers within said housing;
  e. means for providing external adjustment of said first and second potentiometers;
  f. an electrical plug member mounted to said housing for providing a means for electrically decoupling said sensor head from the remainder of said pressure gauge;
  g. electrical coupling means for electrically coupling together said filament, said first and second potentiometers and said electrical plug member.

15. A pressure gauge as described in claim 14 wherein said means for providing a pressurized coupling between said filament and the interior wall of said hollow cylindrical member comprises an O-ring seal.

16. A pressure gauge as described in claim 13 wherein the maximum pressure indication of said indicator is adjustable by varying a first potentiometer coupled in series between said indicator and said second terminal point.

17. A pressure gauge as described in claim 13 wherein the minimum pressure indication of said indicator is adjustable by varying a second potentiometer coupled in series between said second terminal point and said filament.

18. A pressure gauge as described in claim 13 wherein said filament has coupled across it a resistor so as to expand the low pressure range of said gauge.